US010169932B2

(12) United States Patent
Ishikawa et al.

(10) Patent No.: US 10,169,932 B2
(45) Date of Patent: Jan. 1, 2019

(54) ANOMALITY CANDIDATE INFORMATION ANALYSIS APPARATUS AND BEHAVIOR PREDICTION DEVICE

(71) Applicant: Hitachi, Ltd, Chiyoda-ku, Tokyo (JP)

(72) Inventors: Masayoshi Ishikawa, Tokyo (JP); Mariko Okude, Tokyo (JP); Takehisa Nishida, Tokyo (JP); Kazuo Muto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/616,594

(22) Filed: Jun. 7, 2017

(65) Prior Publication Data
US 2017/0358154 A1 Dec. 14, 2017

(30) Foreign Application Priority Data
Jun. 8, 2016 (JP) .................. 2016-114646

(51) Int. Cl.
*G07C 5/00* (2006.01)
*A61B 5/18* (2006.01)
*G07C 5/08* (2006.01)
*G06N 5/04* (2006.01)
*G06N 99/00* (2010.01)
*B60W 50/02* (2012.01)
(Continued)

(52) U.S. Cl.
CPC .......... *G07C 5/0808* (2013.01); *B60W 40/09* (2013.01); *B60W 50/0205* (2013.01); *G06N 5/04* (2013.01);
(Continued)

(58) Field of Classification Search
CPC ........ G07C 5/0808; G07C 5/008; G07C 5/00; H04W 4/029; A61B 5/18; G09B 19/167
See application file for complete search history.

(56) References Cited

U.S. PATENT DOCUMENTS 8,909,415 B1 * 12/2014 Hawley ................. H04W 4/029
701/32.3
9,569,984 B2 * 2/2017 Stankoulov .......... G09B 19/167
(Continued)

FOREIGN PATENT DOCUMENTS

EP 2 690 423 A1 1/2014
EP 2690423 A1 * 1/2014 ............... G07C 5/00
(Continued)

OTHER PUBLICATIONS

European partial search report issued in counterpart European Patent Application No. 17174760.3 dated Dec. 6, 2017 (Sixteen (16) pages).

*Primary Examiner* — Yuri Kan
(74) *Attorney, Agent, or Firm* — Crowell & Moring LLP

(57) ABSTRACT

To provide an anomality candidate information analysis apparatus capable of early confirming that an unexpected anomality occurs in a monitoring object such as a vehicle. There is provided an anomality candidate information analysis apparatus for analyzing anomality candidate information of a vehicle that is a monitoring object. The anomality candidate information analysis apparatus includes a storage unit and an analysis unit. The storage unit stores monitoring object information regarding the vehicle, environment information regarding an environment around the vehicle, operator information regarding an operator of the vehicle, and anomality candidate information detected in the vehicle in association with each other. The analysis unit extracts the anomality candidate information associated with the monitoring object information, the environment information, and the operator information, and analyzes a dependence degree of the anomality candidate information to the environment information and the operator information.

6 Claims, 9 Drawing Sheets

(51) Int. Cl.
*B60W 40/09* (2012.01)
*B60W 50/00* (2006.01)

(52) U.S. Cl.
CPC ........... *G06N 99/005* (2013.01); *G07C 5/008* (2013.01); *G07C 5/08* (2013.01); *G07C 5/085* (2013.01); *B60W 2050/0089* (2013.01); *B60W 2540/28* (2013.01); *B60W 2540/30* (2013.01); *B60W 2550/12* (2013.01); *B60W 2550/141* (2013.01); *B60W 2550/142* (2013.01); *B60W 2550/146* (2013.01)

(56) References Cited

U.S. PATENT DOCUMENTS

| | | |
|---|---|---|
| 2009/0179777 A1 | 7/2009 | Ishikawa |
| 2010/0305806 A1* | 12/2010 | Hawley ................. G07C 5/008 701/31.4 |
| 2012/0053778 A1 | 3/2012 | Colvin et al. |
| 2012/0253586 A1 | 10/2012 | Sakakibara |
| 2013/0093603 A1* | 4/2013 | Tschirhart ................ A61B 5/18 340/902 |

FOREIGN PATENT DOCUMENTS

| | | |
|---|---|---|
| JP | 2002-228556 A | 8/2002 |
| JP | 2006-349428 A | 12/2006 |
| JP | 2007-58344 A | 3/2007 |
| JP | 4107238 B2 | 6/2008 |
| JP | 2011-221813 A | 11/2011 |
| JP | 2012-185558 A | 9/2012 |
| JP | 2015-219029 A | 12/2015 |
| WO | WO 2014/035385 A1 | 3/2014 |

* cited by examiner

[Fig. 1]
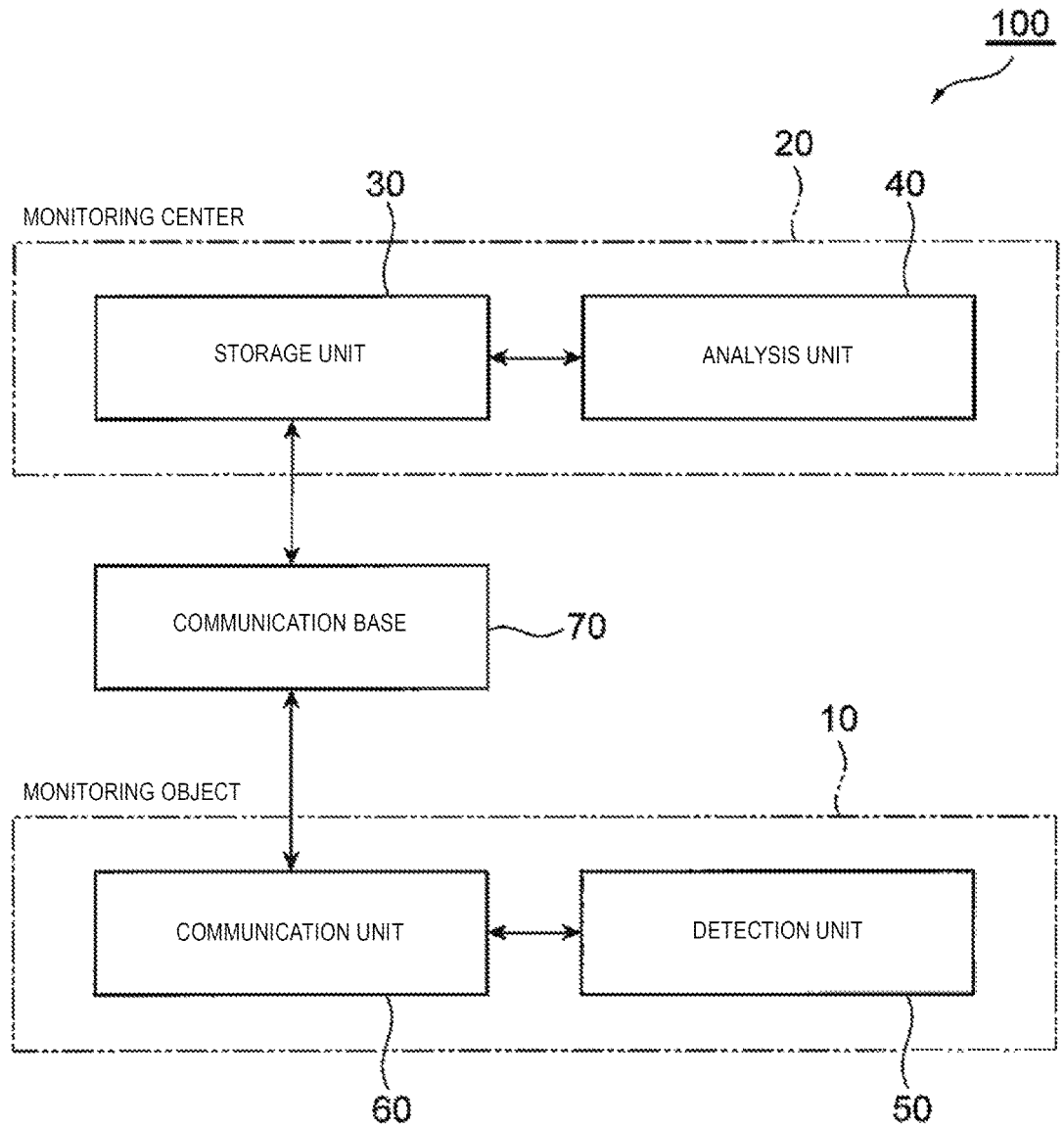

[Fig. 2]
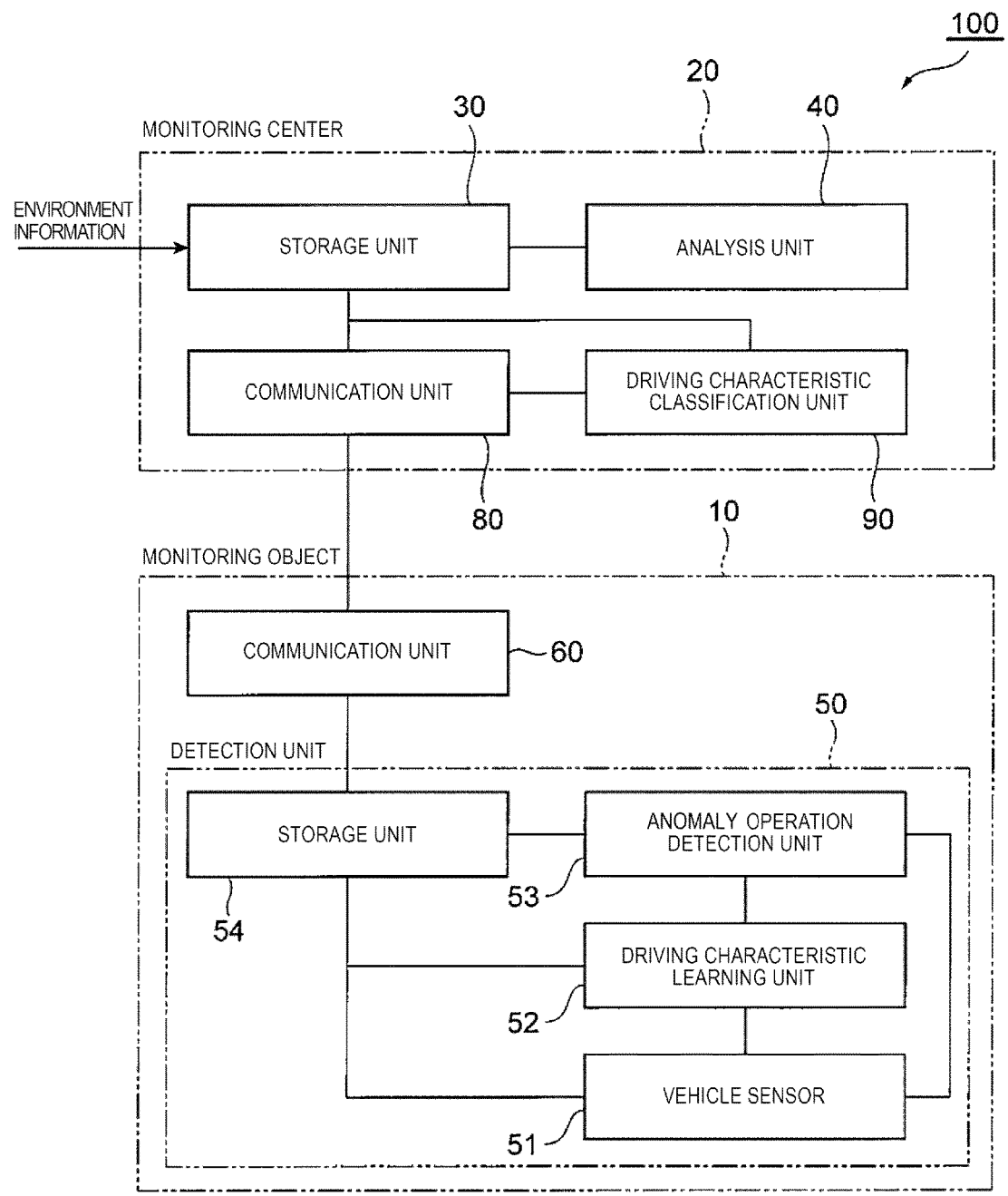

[Fig. 3]
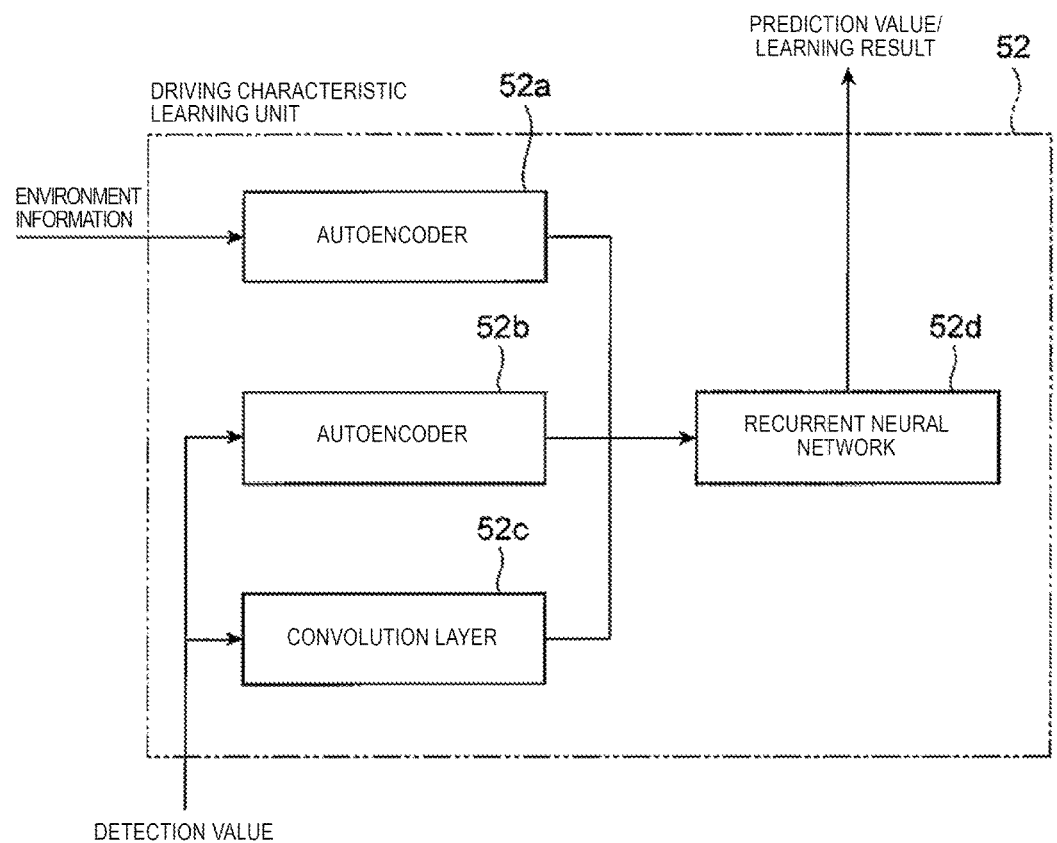

[Fig. 4]
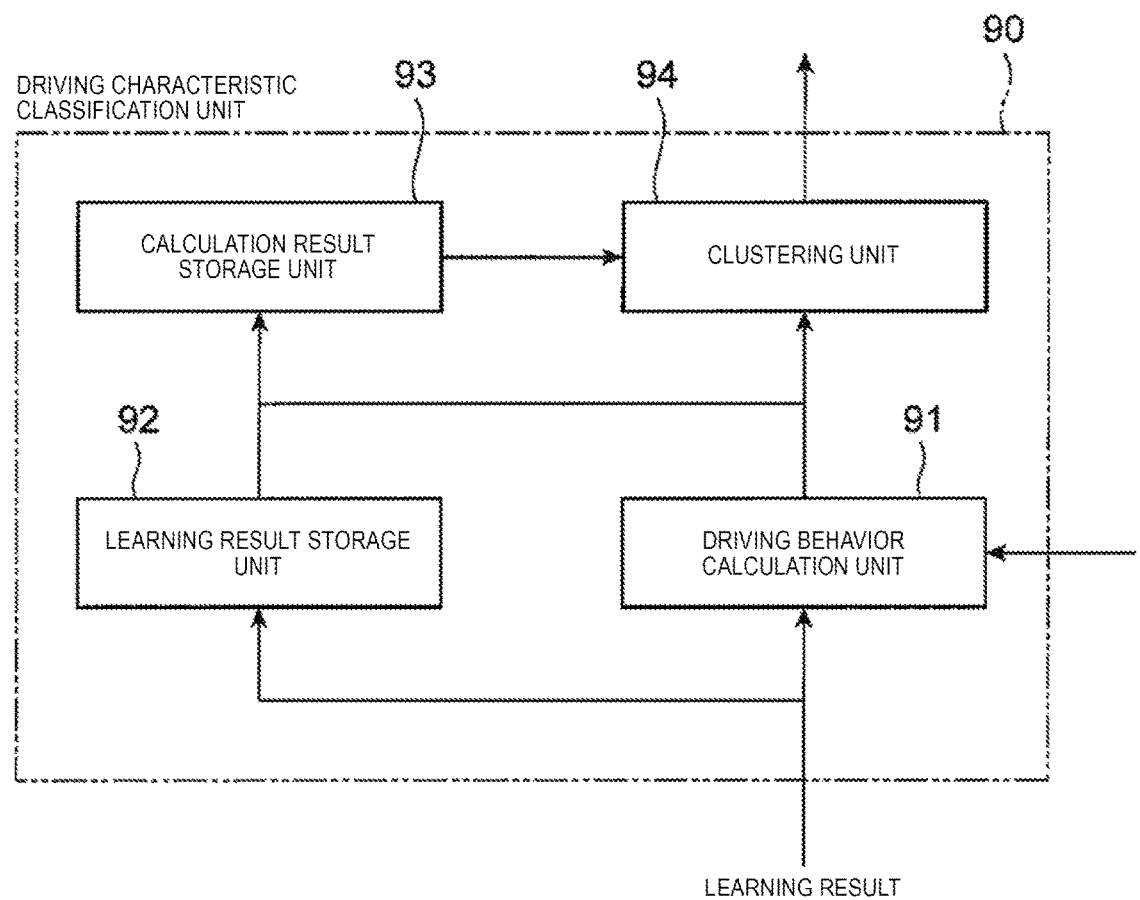

[Fig. 5]
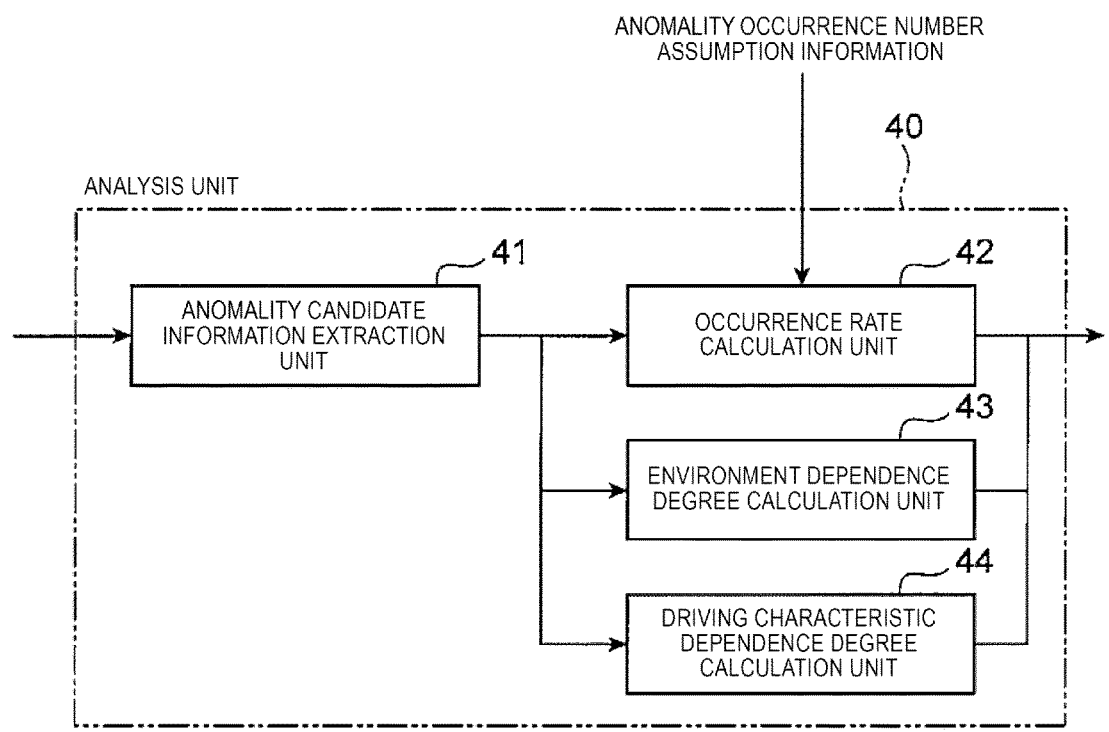

[Fig. 6]
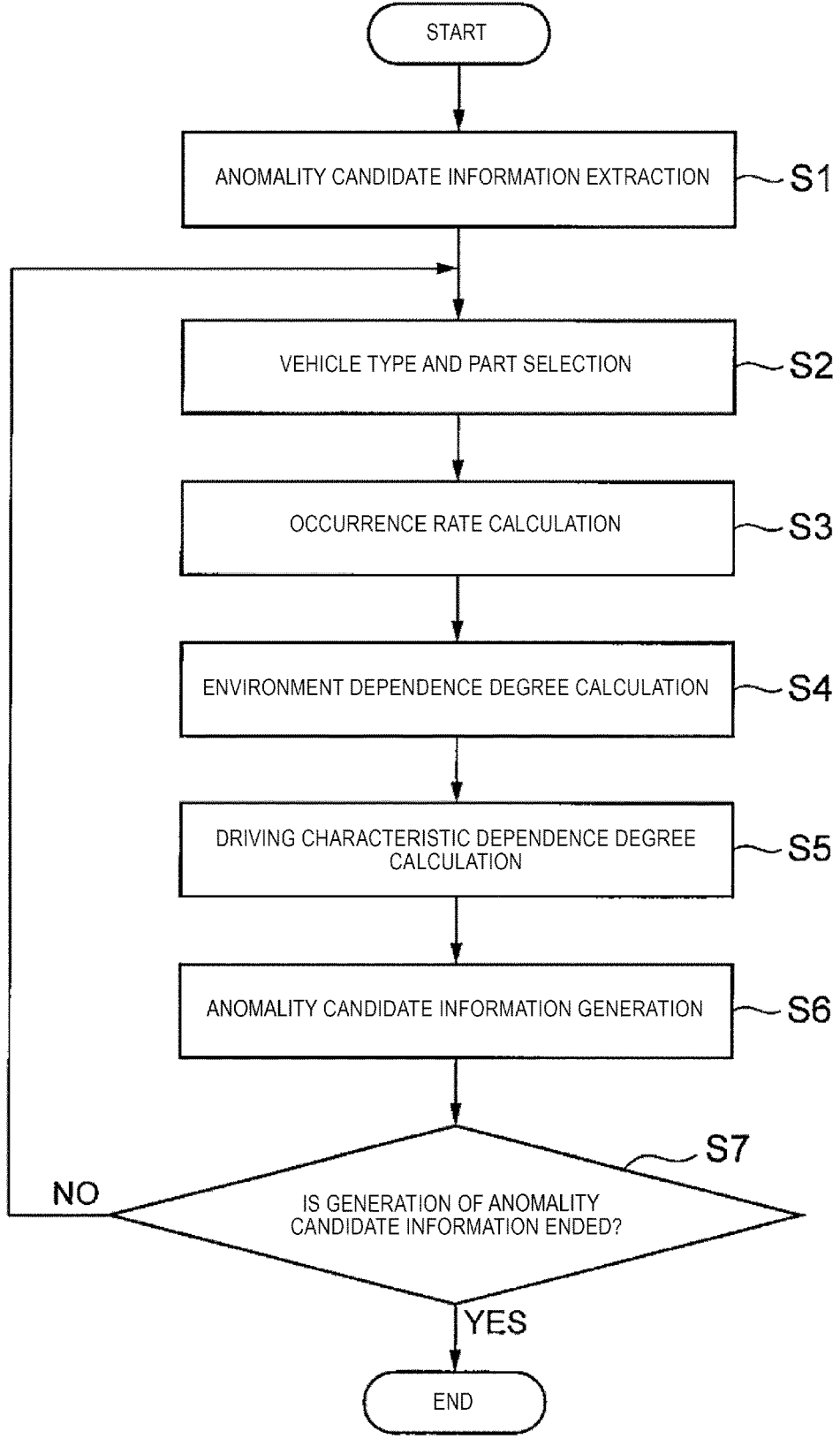

[Fig. 7]
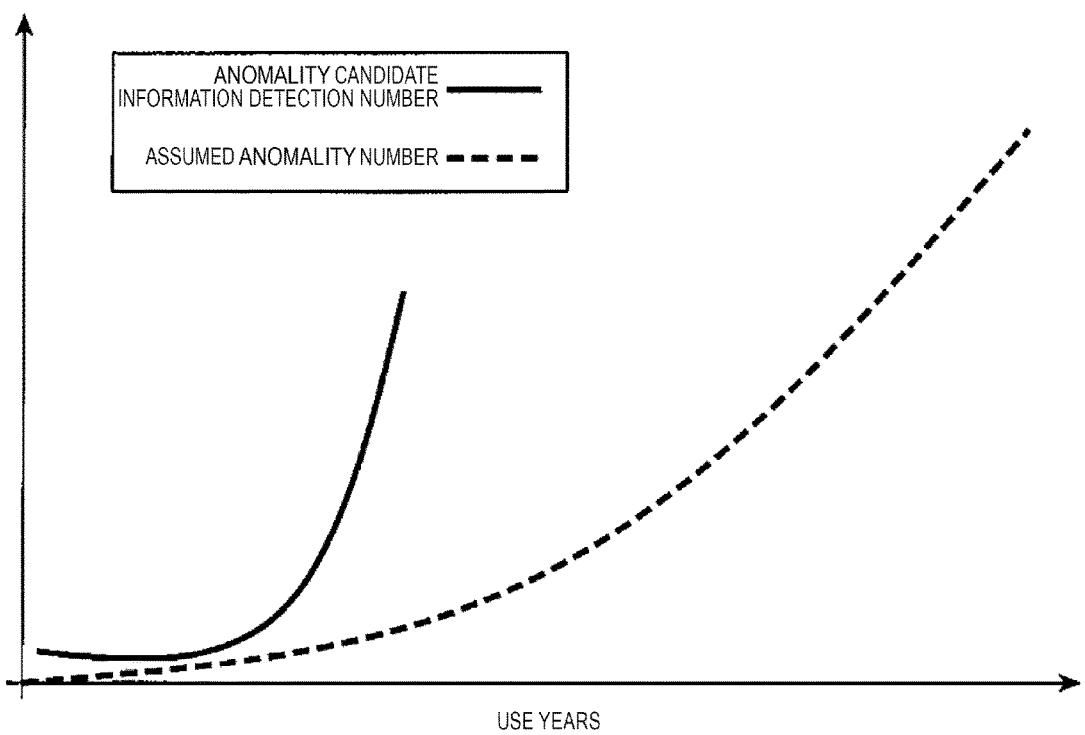

[Fig. 8]
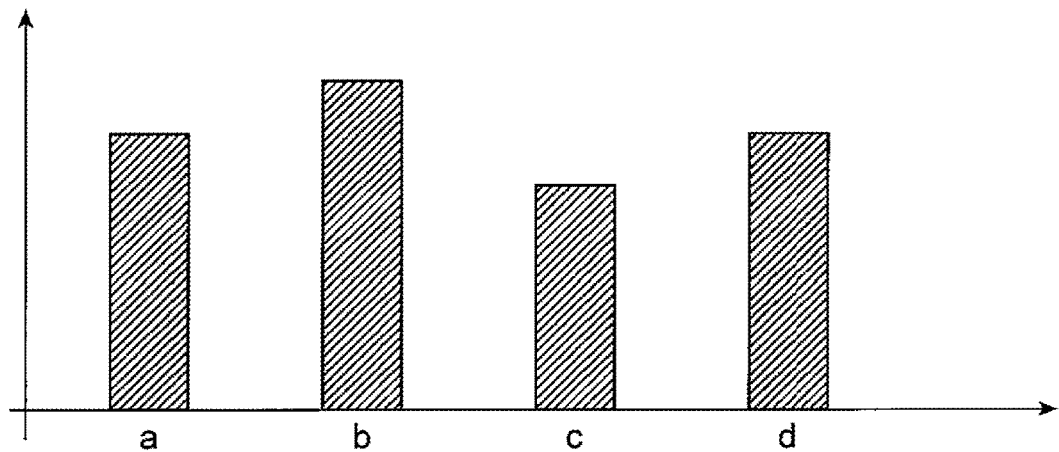
[Fig. 9]
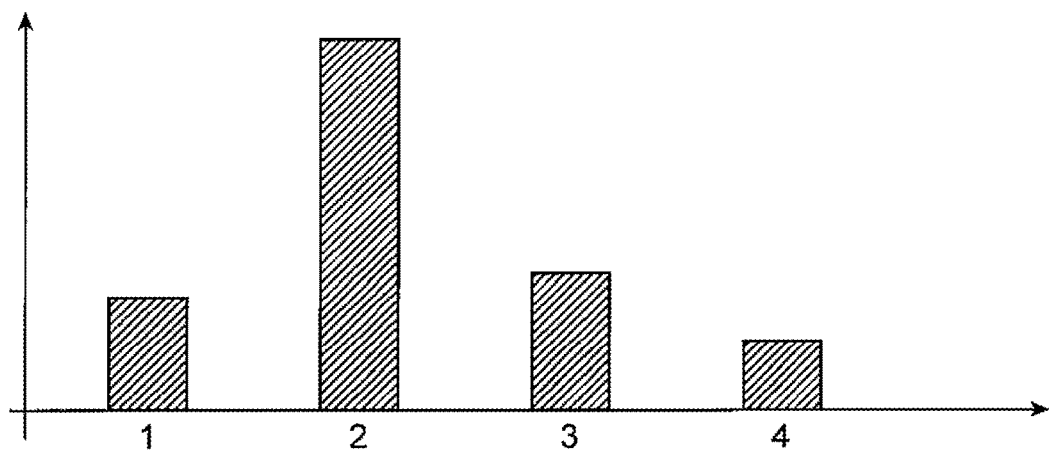

[Fig. 10]
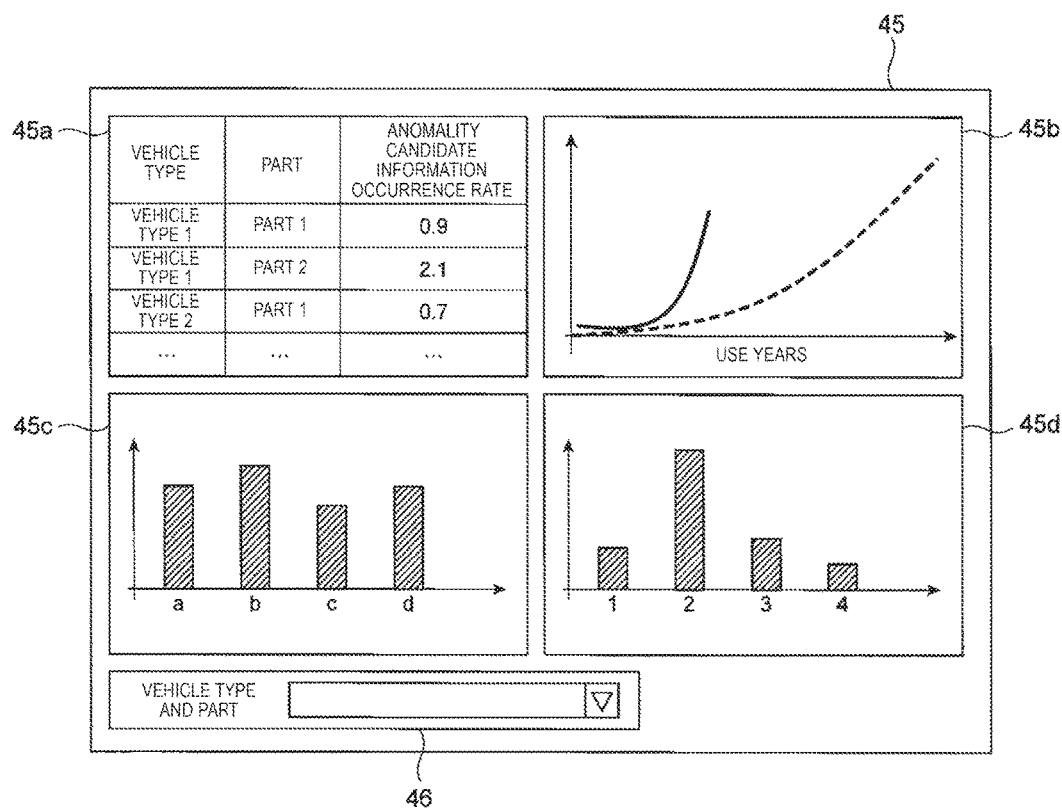

ANOMALITY CANDIDATE INFORMATION ANALYSIS APPARATUS AND BEHAVIOR PREDICTION DEVICE

TECHNICAL FIELD

The present invention relates to an apparatus for analyzing information collected from a monitoring object such as a vehicle, and a behavior prediction device used for the apparatus.

BACKGROUND ART

A failure diagnosis apparatus for diagnosing a failure occurred in a vehicle has been conventionally known (refer to PTL 1). The failure diagnosis apparatus described in the same literature is a failure diagnosis apparatus for outside a vehicle, and includes an acquisition unit, a determination standard change unit, and an extraction unit (refer to the same literature, claim 1 or the like).

The acquisition unit acquires information regarding a failure detected in a vehicle using communication. When one failure is detected in one vehicle, the determination standard change unit changes a failure occurrence determination standard for the failure to a more moderate standard in the other one or more vehicle types that are similar to the one vehicle in a vehicle state or attribute. The extraction unit extracts the vehicle state or characteristics of a vehicle surrounding environment common to the vehicle on which the failure is detected, among the other one or more vehicles, according to the more moderate failure determination standard.

It is described that by the configuration, when the failure is detected in a certain vehicle, it is possible to examine whether a sign, that a failure is likely to occur in the other vehicle in a vehicle state similar to the vehicle, is shown in the same literature. In addition, the same literature describes that according to the examination, it is possible to estimate a condition that the failure is likely to occur by searching for a common point of the vehicle state and a surrounding environment of the vehicle in which the sign is shown, and it is possible to efficiently define and repair a failed part by using the estimation result (refer to same literature, paragraph 0012 or the like).

CITATION LIST

Patent Literature

PTL 1: JP-A-2006-349428

SUMMARY OF INVENTION

Technical Problem

The failure diagnosis apparatus described in PTL 1 acquire the information regarding the detected failure in the vehicle by the acquisition unit. However it is difficult to early confirm that an unexpected anomaly occurs by only acquiring the information regarding a failure when the failure in a certain vehicle is detected.

The present invention has been made in view of the foregoing problem, and an object of the present invention is to provide an anomality candidate information analysis apparatus capable of early confirming that an unexpected anomality occurs in a monitoring object such as a vehicle, and a behavior prediction device used for the apparatus.

Solution to Problem

In order to attain the above object, the anomality candidate information analysis apparatus of the present invention is an anomality candidate information analysis apparatus for analyzing anomality candidate information of a monitoring object including a storage unit that stores monitoring object information regarding the monitoring object, environment information regarding an environment around the monitoring object, operator information regarding an operator of the monitoring object, and anomality candidate information detected in the monitoring object in association with each other, and an analysis unit that extracts the anomality candidate information associated with the monitoring object information, the environment information, and the operator information, and analyzes a dependence degree of the anomality candidate information to the environment information and the operator information.

Advantageous Effects of Invention

According to the anomality candidate information analysis apparatus of the present invention, it is possible to analyze a dependence degree of anomality candidate information to environment information and operator information by extracting the stored anomality candidate information which is associated with monitoring object information, the environment information, and the operator information. Accordingly, it is possible to early confirm that the unexpected anomality occurs in the monitoring object such as the vehicle and it is possible to specify a cause.

BRIEF DESCRIPTION OF DRAWINGS

FIG. 1 is a block diagram illustrating one embodiment of an anomality candidate information analysis apparatus of the present invention.

FIG. 2 is a block diagram illustrating an example of a configuration of the anomality candidate information analysis apparatus illustrated in FIG. 1.

FIG. 3 is a block diagram illustrating an example of a configuration of a driving characteristic learning unit illustrated in FIG. 2.

FIG. 4 is a block diagram illustrating an example of a configuration of a driving characteristic classification unit illustrated in FIG. 2.

FIG. 5 is a block diagram illustrating an example of a configuration of an analysis unit illustrated in FIG. 2.

FIG. 6 is a flow chart illustrating an example of an operation of the anomality candidate information analysis apparatus.

FIG. 7 is a graph illustrating an example of an assumed anomaly curve and an anomality candidate curve.

FIG. 8 is a graph illustrating an example of a dependence degree of the detection number of anomality candidate information items to an environment.

FIG. 9 is a graph illustrating an example of a dependence degree of the detection number of the anomality candidate information items to a driving characteristic.

FIG. 10 is an image diagram illustrating an example of an output screen of the anomality candidate information.

DESCRIPTION OF EMBODIMENTS

Hereinafter, an embodiment of an anomality candidate information analysis apparatus and a behavior prediction device of the present invention will be described with reference to drawings.

FIG. 1 is a block diagram illustrating one embodiment of an anomality candidate information analysis apparatus of the present invention.

An anomality candidate information analysis apparatus 100 of the present embodiment is, for example, an apparatus for analyzing anomality candidate information of a vehicle 10 in order to early confirm that an unexpected anomaly occurs in the vehicle 10 that is a monitoring object. Here, the anomality candidate information is, for example, information having a possibility of the unexpected anomaly occurred in the vehicle 10 and can include information regarding various parts configuring the vehicle 10. Hereinafter, the monitoring object will be described as the vehicle 10. However, the monitoring object is not limited to the vehicle 10, and can include various types of devices operated by an operator such as a machine tool or a civil engineering machine, for example.

As illustrated in FIG. 1, the anomality candidate information analysis apparatus 100 of the present embodiment is provided outside the monitoring object and can be configured as a monitoring center 20 including a storage unit 30 and an analysis unit 40. In addition, the anomality candidate information analysis apparatus 100 of the present embodiment can be configured as a monitoring system including the monitoring center 20, a detection unit 50 and a communication unit 60 provided on the vehicle 10 that is a monitoring object, and a communication base 70.

The vehicle 10, the communication base 70, and the monitoring center 20 can communicate with each other through a standardized high speed network. The high-speed network can be configured by at least one of a wired network and a wireless network. In the example illustrated in FIG. 1, the communication base 70 is provided outside the monitoring center 20. The monitoring center 20 may include a communication unit for communicating with the communication unit 60 of the vehicle 10.

The storage unit 30 can include, for example, an arithmetic device such as CPU, a primary storage such as a semiconductor memory, a secondary storage such as a hard disk, a tertiary storage such as a removable media drive, or the like. The storage unit 30 can store, for example, various information items acquired from the communication base 70. More specifically, the storage unit 30 stores monitoring object information regarding the vehicle 10 that is a monitoring object, environment information regarding an environment around the vehicle 10, operator information regarding an operator of the vehicle 10, and anomality candidate information detected in vehicle 10 in association with each other.

The monitoring object information can include, for example, a vehicle type of the vehicle 10, a chassis number, a vehicle ID, a component part, a part manufacturing number, a cumulative driving distance, use years or use months, positional information, a velocity, an acceleration rate, a jerk, an angular speed, a roll, a pitch, a yaw, a torque, an operation amount of an accelerator, an accelerator opening degree, an engine rotating speed, a brake operation amount, a shift change operation, a steering operation amount, a steering angle, an image of in-vehicle camera, distance information of a laser radar, a fuel consumption, or the like.

These information items are shared through an in-vehicle network such as a control area network (CAN), for example.

The environment information can includes, for example, a weather, a temperature, an atmospheric pressure, humidity, an altitude, a time zone, a road surface condition, a traffic condition, a road condition such as an inclination and a curve, a surrounding environment such as an urban area and mountain, road information such as a toll road and a notional road.

The operator information can include, for example, the age, sex, nationality, driving characteristic type, and the like of an operator. Here, the driving characteristic type is, for example, a plurality of types classified according to an operation tendency of the operator of the monitoring object, that is, a driving tendency of a driver of the vehicle 10. Examples of such driving characteristic types can include, for example, the driving characteristic type of the driver who favors a sudden operation, the driving characteristic type of the driver who favors a gentle operation, the driving characteristic type of the experienced driver, the driving characteristic type of a driving beginner, the driving characteristic type of the elderly, the driving characteristic type of the driver driving at night, the driver characteristic type of the driver driving during the day, or the like.

The storage unit 30 can stores, for example, the monitoring object information, the environment information, the operator information, and the anomality candidate information in association with each other for each vehicle type, chassis number, and vehicle ID. That is, in the storage unit 30, the monitoring object information, the environment information, the operator information, and the anomality candidate information are stored for each vehicle type, chassis number, vehicle ID, parts, and part manufacturing number.

The analysis unit 40 can be configured of, for example, the arithmetic device such as CPU, a storage such as the semiconductor memory and the hard disk, a program stored in the storage, an input device such as a keyboard, a display device such as a liquid crystal panel, or the like. Although it will be described in detail later, the analysis unit 40 extracts the anomality candidate information which is associated with the monitoring object information, the environment information, and the operator information stored in the storage unit 30 and analyzes a dependence degree of the anomality candidate information to the environment information and the operator information. An analyst of the anomality candidate information belonging to the monitoring center 20, for example, extracts the anomality candidate information associated with the monitoring object information, the environment information, and the operator information by operating the analysis unit 40, outputs the dependence degree of the anomality candidate information to the environment information and operator information, early finds a problem with a high possibility of unexpected anomality, and analyzes an occurrence status, whereby investigating the cause.

The communication base 70 is connected to the storage unit 30 of the monitoring center 20 so as to be capable of information communication and is connected to the communication unit 60 of the vehicle 10 that is the monitoring object so as to be capable of information communication. In a case where the monitoring object is a moving body such as the vehicle 10, the vehicle 10 and the communication base 70 can be connected by a wireless communication line, for example. In a case where the monitoring object does not move such as the machine tool, the monitoring object and the communication base 70 can be connected by the wired communication line. In addition, the connection of the communication base 70 and the storage unit 30 of the monitoring center 20 may be the connection by the wireless communication line or may be the connection by the wired communication line.

The detection unit 50 provided on the vehicle 10 detects at least a part of the monitoring object information, the operator information, and the anomaly candidate information described above regarding the vehicle 10 and outputs the detected information to the communication unit 60 of the vehicle 10. The detection unit 50 is configured of, for example, the arithmetic device such as CPU, the storage such as the semiconductor memory and the hard disk, the program stored in the storage, various sensors, a camera, the laser radar, or the like.

For example, the communication unit 60 which is provided on the vehicle 10 is configured of a wireless communicator, and is connected to the detection unit 50 provided on the vehicle 10. The communication unit 60 transmits at least a part of the monitoring object information, the operator information, and the anomaly candidate information detected by the detection unit 50 to the communication base 70.

FIG. 2 is a block diagram illustrating an example of a more detailed configuration of the anomaly candidate information analysis apparatus 100 illustrated in FIG. 1.

In FIG. 1, a configuration that the information transmitted from the communication unit 60 of the vehicle 10 is received by the external communication base 70, and the information received by the external communication base 70 is stored in the storage unit 30 of the monitoring center 20 is illustrated. With respect to this, in the example illustrated in FIG. 2, a communication unit 80 receiving the information transmitted from the communication unit 60 of the vehicle 10 is included in the monitoring center 20. In also the example illustrated in FIG. 2, similar to the example illustrated in FIG. 1, a configuration that the storage unit 30 of the monitoring center 20 receives the information transmitted from the communication unit 60 of the vehicle 10 through the external communication base 70 may be provided.

In the example illustrated in FIG. 2, the detection unit 50 provided on the vehicle 10 that is the monitoring object includes, for example, a vehicle sensor 51, a driving characteristic learning unit 52, an anomaly operation detection unit 53, and a storage unit 54. Each part of the detection unit 50 can include, for example, the arithmetic device such as CPU, the storage such as the semiconductor memory and the hard disk, and the program stored in the storage.

The vehicle sensor 51 can include, for example, various types of sensors for detecting various types of information items of the vehicle 10, the camera, and the laser radar. Among the above-described monitoring object information items, the vehicle sensor 51 detects, for example, the cumulative driving distance, the positional information, the velocity, the acceleration rate, the jerk, the angular speed, the roll, the pitch, the yaw, the torque, the operation amount of an accelerator, the accelerator opening degree, the engine rotating speed, the brake operation amount, the shift change operation, the steering operation amount, the steering angle, the image of in-vehicle camera, the distance information of the laser radar, or the like. An example of the information detected by the vehicle sensor 51 will be illustrated in Table 1 below. As illustrated in Table 1, the information detected by the vehicle sensor 51 can include, for example, any information exchanged on CAN such as time.

TABLE 1

| Time | Accelerator Opening Degree | Engine Rotating Speed | ... |
|---|---|---|---|
| 08:40:41 | 10 | 400 | ... |
| 08:40:42 | 15 | 500 | ... |
| 08:40:43 | 20 | 600 | ... |
| ... | ... | ... | ... |

For example, the driving characteristic learning unit learns an operation performed by the operator of the monitoring object as a driving characteristic from the detection value of the monitoring object information to predict the detection value of the monitoring object information. That is, the driving characteristic learning unit 52 is a behavior prediction device for predicting a behavior of the driver of the vehicle 10 and predicts the detection value of the monitoring object information by learning the operation performed by the driver as the driving characteristic from the detection value of the monitoring object information that is the information regarding the vehicle 10. More specifically, the driving characteristic learning unit 52 learns the operation such as the acceleration and deceleration performed by the driver in a certain situation as the driving characteristic of the driver based on the monitoring object information detected by the vehicle sensor 51 and the environment information received by the communication unit 60 of the vehicle 10. In addition, the driving characteristic learning unit 52 transmits, for example, a learning result of the driving characteristic to the communication unit 80 of the monitoring center 20 through the storage unit 54 and the communication unit 60 of the vehicle 10. In addition, for example, the driving characteristic learning unit 52 calculates the prediction value of the detection value of the vehicle sensor 51 after a lapse of a predetermined time based on the learning result of the driving characteristic of the driver and outputs the calculated prediction value to the anomaly operation detection unit 53. The prediction value represents a control amount desired by the driver such as the accelerator opening degree or the velocity of the vehicle 10.

The anomaly operation detection unit 53 detects, for example, the detection value of the monitoring object information as the anomaly candidate information using the prediction value of the detection value of the monitoring object information predicted by the driving characteristic learning unit 52 as a threshold value. More specifically, the anomaly operation detection unit 53 detects, for example, the anomaly candidate information having a possibility of the anomaly operation of the vehicle 10 by comparing the detection value of the vehicle sensor 51 and the prediction value calculated by the driving characteristic learning unit 52. The prediction value calculated by the driving characteristic learning unit 52 represents a desired control amount of the driver based on a past normal operation performed by the driver in a certain situation. Accordingly, in a case where when the prediction value and the detection value of the vehicle sensor 51 are compared, the difference between them is larger, the detection value of the vehicle sensor 51 can be detected as the anomaly candidate information having a possibility of the anomaly operation of the vehicle 10 different from the intention of the driver. That is, for example, the anomaly operation detection unit 53 can detect the anomaly candidate information of the vehicle 10 that is the monitoring object using the prediction value calculated by the driving characteristic learning unit 52 as the threshold value of the detection value of the vehicle sensor 51.

Furthermore, for example, the anomaly operation detection unit 53 can detect and output a part relating to the detected anomaly candidate information, that is, the anomality candidate part. More specifically, in a case where a braking distance which is actually detected by the vehicle sensor 51 is larger than a braking distance of the vehicle 10 calculated by the driving characteristic learning unit 52 in a certain situation, the anomaly operation detection unit 53 detects a breaking device as an anomaly candidate part. In addition, for example, in a case where the engine rotating speed which is actually detected by the vehicle sensor 51 is lower than the engine rotating speed calculated by the driving characteristic learning unit 52 in a certain situation, the anomaly operation detection unit 53 detects the engine as the anomality candidate part.

The storage unit 54 stores, for example, the information detected by the vehicle sensor 51, the driving characteristic learning unit 52, and the anomaly operation detection unit 53. The communication unit 60 of the vehicle 10 transmits the information which is detected or calculated by the vehicle sensor 51, the driving characteristic learning unit 52, and the anomaly operation detection unit 53 of the detection unit 50 and stored in the storage unit 54 to the communication unit 80 of the monitoring center 20. The detection unit 50 may not have the storage unit 54. In this case, the information detected by the vehicle sensor 51, the driving characteristic learning unit 52, and the anomaly operation detection unit 53 is transmitted to the communication unit 80 of the monitoring center 20 through the communication unit 60 of the vehicle 10.

In the storage unit 54, for example, identification information of the vehicle 10 such as the vehicle ID, the chassis number, the vehicle type, the component part, or the part manufacturing number of the vehicle 10 is stored in advance. Each part of the detection unit 50 or the communication unit 60 associates the identification information of the vehicle 10 which is stored in the storage unit 54 in advance and various types of information items which are detected by the vehicle sensor 51, the driving characteristic learning unit 52, and the anomaly operation detection unit 53 and stored in the storage unit 54 such as the cumulative driving distance, the use years, the positional information, a learning result of the normal driving characteristic of the driver, and a learning result of the anomaly driving characteristic. The communication unit 60 transmits various types of information items associated with the identification information of the vehicle 10 to the monitoring center 20. The various types of information items transmitted from the vehicle 10 to the monitoring center 20 is, for example, received by the communication unit 80 of the monitoring center 20, is associated with the environment information, and is stored in the storage unit 30 of the monitoring center 20. That is, the storage unit 30 of the monitoring center 20 is an anomaly candidate information database in which the anomality candidate information which is collected from the vehicle 10 is stored.

In the example illustrated in FIG. 2, the monitoring center 20 includes the communication unit 80 and a driving characteristic classification unit 90 in addition to the storage unit 30 and the analysis unit 40. For example, the communication unit 80 is connected to the communication unit 60 of the vehicle 10 so as to be capable of information communication, and is connected to the storage unit 30 and the driving characteristic classification unit 90 of the monitoring center 20 so as to be capable of information communication. The communication unit 80 of the monitoring center 20 outputs the information received from the communication unit 60 of the vehicle 10 to the storage unit 30 and the driving characteristic classification unit 90 of the monitoring center 20.

The driving characteristic classification unit 90 classifies the driving characteristic included in the operator information into one of a plurality of driving characteristic types. More specifically, the driving characteristic classification unit 90 classifies the learning result of the plurality of driving characteristics collected from the vehicle 10 into the above-described plurality of driving characteristic types. That is, the driving characteristic classification unit 90 classifies the learning result of the driving characteristic representing the tendency of an individual driving characteristic into one of several categorized driving characteristic types. The learning result of the driving characteristic collected from each vehicle 10 depends on the tendency of the driver's individual driving and indicates the driver's individual driving characteristic. With respect to this, as described above, the driving characteristic type indicates several typical driving characteristics common to a plurality of drivers. For example, the driving characteristic classification unit 90 classifies the learning result of the plurality of driving characteristics collected from the vehicle 10 into the plurality of driving characteristic types and stores the classified driving characteristic types to the storage unit 30 of the monitoring center 20.

FIG. 3 is a block diagram illustrating an example of a more detailed configuration of the driving characteristic learning unit 52 illustrated in FIG. 2.

In the example illustrated in FIG. 3, the driving characteristic learning unit 52 includes, for example, autoencoders 52a and 52b, a convolution layer 52c, and a recurrent neural network 52d. The driving characteristic learning unit 52 is not limited to the configuration including the recurrent neural network 52d and may have a configuration including the Kalman filter or a particle filter, for example. The recurrent neural network 52d has an advantage that a process relating to learning can be collectively performed as compared with the Kalman filter or the particle filter.

One autoencoder 52a is, for example, a layer in which a characteristic extraction is performed from the environment information which is transmitted from the monitoring center 20 to the vehicle 10. Another autoencoder 52b is, for example, a layer in which the characteristic extraction is performed form the detection value of the vehicle sensor 51 excluding the detection value of an in-vehicle camera or the laser radar. The convolution layer 52c is, for example, a layer in which the characteristic extraction is performed from the detection value of the in-vehicle camera or the laser radar among the detection values of the vehicle sensor 51. The characteristics extracted by the autoencoders 52a and 52b and the convolution layer 52c are input to the recurrent neural network 52d.

For example, the recurrent neural network 52d calculates and outputs the prediction value of the detection value of the vehicle sensor 51 after a time k. For example, the recurrent neural network 52d is used for predicting the detection value of the vehicle sensor 51 of the vehicle 10 that is sequentially controlled by the driver. Here, for example, the sequential control of the vehicle 10 by the driver includes controlling the velocity and an inter-vehicle distance of the vehicle by recognizing an external environment such as the weather, the road surface condition, and the inter-vehicle distance and an internal environment such as the velocity or the engine of the host vehicle by the driver.

For example, the recurrent neural network 52d can learn the characteristic information required for reproducing a determination of the driver by using the autoencoders 52a and 52b and the convolution layer 52c. The learning by the recurrent neural network 52d can be performed by predicting the detection value of the vehicle sensor 51 after the time k from the environment information and the detection value of the vehicle sensor 51 and by back-propagating an error between the prediction value and the actual detection value of the vehicle sensor 51 after the time k by a probability gradient descent method. For example, the recurrent neural network 52d can output the learning result and the prediction value after the time k to the anomaly operation detection unit 53 and the storage unit 54.

For example, the recurrent neural network 52d can output the plurality of prediction values with respect to each of the various types of sensors included in the vehicle sensor 51. More specifically, for example, the driving characteristic learning unit 52 can include the plurality of recurrent neural networks 52d and can output the plurality of different prediction values with respect to each of the various types of sensors by each of the recurrent neural networks 52d. In this case, for example, learning data items given in the plurality of recurrent neural networks 52d can be selected by a method called competitive learning.

More specifically, for example, time series data of the vehicle sensor 51 is predicted by the plurality of recurrent neural networks 52d and the prediction value of the recurrent neural network 52d that most accurately predicts the time series data of the vehicle sensor 51 at each time is set as the learning data. In this case, for example, in a case where the minimum error between the prediction value of the recurrent neural network 52d and the detection value of the vehicle sensor 51 is equal to or more than a certain threshold value, the anomaly operation detection unit 53 detects the detection value of the vehicle sensor 51 as the anomaly candidate information having a possibility of the anomaly operation. That is, among the plurality of prediction values of the plurality of recurrent neural networks 52d, the anomaly operation detection unit 53 sets the prediction value close to the detection value of the monitoring object information as a threshold value, and detects the detection value of the monitoring object information as the anomaly candidate information based on the threshold value.

In order to cope with sequentially changing road condition, the actual driver is always driving while anticipating a plurality of statuses. More specifically, before passing through an intersection, the driver is driving while anticipating a status of passing through the intersection with a green light as it is, or a status in which the vehicle 10 is stopped in front of the intersection after changing the signal from the green light to the red light. Therefore, by outputting the plurality of prediction values by the recurrent neural network 52d, it is possible for the driver to simulate anticipating a plurality of situations, and it is possible to more accurately learn the driving characteristic of the driver.

Furthermore, the driving characteristic learning unit 52 can be configured to be switchable between the learning period and the prediction period. In the learning period, the driving characteristic learning unit 52 performs learning by the error between the actual detection value of the vehicle sensor 51 and the prediction value in addition to the prediction value of the detection value of the vehicle sensor 51 after the time k. In addition, in the prediction period, the driving characteristic learning unit 52 performs only prediction of the detection value of the vehicle sensor 51 after the time k. For example, the learning period and the prediction period of the driving characteristic learning unit 52 can be determined from the behavior of the vehicle sensor 51.

For example, an interval where the anomaly candidate information cannot be detected by the anomaly operation detection unit 53 can be set as the learning period of the driving characteristic learning unit 52. In addition, for example, the interval where the time difference of the vehicle speed of the vehicle sensor 51 is equal to or less than a certain value can be set as the learning period of the driving characteristic learning unit 52. The learning result of the driving characteristic transmitted from the driving characteristic learning unit 52 to the driving characteristic classification unit 90 is, for example, a parameter of each layer of the recurrent neural network 52d.

FIG. 4 is a block diagram illustrating an example of a more detailed configuration of the driving characteristic classification unit 90 illustrated in FIG. 2.

The driving characteristic classification unit 90 can include, for example, a driving behavior calculation unit 91, a learning result storage unit 92, a calculation result storage unit 93, and a clustering unit 94. The driving behavior calculation unit 91 can include, for example, a driving behavior assessment set which is input and stored in advance. The driving behavior assessment set includes a plurality of assessment patterns, for example. As the assessment pattern, for example, a situation in which the vehicle follows a preceding vehicle, a situation in which no preceding vehicle exists in front of the host vehicle, or the like can be exemplified. Pseudo information of the vehicle sensor 51 is given to the driving behavior calculation unit 91 by simulation, and is used as an input of the recurrent neural network 52d which is obtained by the driving characteristic learning unit 52.

For example, the driving behavior calculation unit 91 calculates the driving behavior of the driver using the learning result of the driving characteristic learning unit 52 received from the vehicle 10 and the driving behavior assessment set. The driving behavior calculation unit 91 calculates the driving behavior for each assessment pattern stored in the driving behavior assessment set. According to the calculation of the driving behavior, a vehicle control of the driver in a certain assessment pattern is predicted. That is, in the calculation of the driving behavior, the accelerator opening degree or the vehicle velocity obtained by the controlling of the driver in a certain pattern is calculated. The calculation result of the driving behavior is obtained by forward propagation of the recurrent neural network 52d obtained in the driving characteristic learning unit 52.

The learning result storage unit 92 stores the learning result of the driving characteristic by the driving characteristic learning unit 52 collected from the plurality of vehicles 10. The calculation result storage unit 93 stores the calculation result of the driving behavior calculation unit 91 which is associated with the learning result of the driving characteristic by the driving characteristic learning unit 52 collected from the vehicle 10 and the assessment pattern.

The clustering unit 94 performs clustering the driver to the plurality of driving characteristic types using the value of the calculation result of the driving behavior for each assessment patter stored in the calculation result storage unit 93. Here, the clustering is, for example, a method such as k-means, and is performed by regarding the calculation result of the driving behavior for each assessment pattern of the driving behavior assessment set as one data.

In a case where the learning result of the driving characteristic is newly obtained thereafter, the clustering unit 94 calculates the driving behavior, calculates whether the obtained calculation result of the driving behavior is classified into which past driver type, and assigns the driving characteristic type. The assignment of the driving characteristic type is performed for both the learning result of the normal driving characteristic and the learning result of the anomaly driving characteristic. The assigned learning results are associated with the other information and stored in the storage unit 30 of the monitoring center 20.

The learning results of the plurality of driving characteristics collected from the plurality of vehicles 10 are learning results obtained in the different environments. Therefore, by simulating the same environment in the specific assessment pattern as described above and comparing the driving behavior obtained at that time, it is possible to quantify the similarity and difference in the driving characteristic.

An example of the monitoring object information, the environment information, and the operator information which are associated with each other and stored in the storage unit 30 of the monitoring center 20 is illustrated in Tables 2 and 3 below.

In Table 3, the anomaly driving characteristic type is a driving characteristic type of the driver at the time of the anomality candidate information detection classified by the driving characteristic classification unit 90. The use years is the use years of the vehicle 10 in which the anomality candidate information is detected. The storage unit 30 may store not only the use years of the vehicle 10 but also the use years of each part. The cumulative driving distance is a cumulative driving distance of the vehicle 10 in which the anomality candidate information is detected. The occurrence frequency is a detection frequency of the anomality candidate information in the vehicle 10 in which the anomality candidate information is detected, for example, the detection frequency of the anomality candidate information per 1000 km. The weather is the weather in the day and an area in which the anomality candidate information is detected. The

TABLE 2

| Anomality Candidate Number | Vehicle ID | Occurrence Day | Occurrence Position | Related Portion | Vehicle Type | Part Information | Normal Driving Characteristic Type |
|---|---|---|---|---|---|---|---|
| 1 | ID1 | 2016 Jan. 1 | Spot 1 | Engine | Vehicle type 1 | A, B, C | Type 1 |
| 2 | ID2 | 2016 Mar. 4 | Spot 2 | Engine | Vehicle type 1 | A, B, D | Type 1 |
| 3 | ID3 | 2016 May 8 | Spot 3 | Control device | Vehicle type 2 | A, B, C | Type 1 |
| 4 | ID4 | 2016 Jul. 1 | Spot 4 | Control device | Vehicle type 2 | A, X, Z | Type 2 |
| . . . | . . . | . . . | . . . | . . . | . . . | . . . | . . . |

TABLE 3

| Anomality Candidate Number | Vehicle ID | Anomaly Driving Characteristic Type | Use Years | Cumulative Driving Distance | Occurrence Frequency times/$10^3$ km | Weather | Road Surface Condition |
|---|---|---|---|---|---|---|---|
| 1 | ID1 | Type 1 | 2 years | 2000 km | 0.5 | Snow | Snowpacked |
| 2 | ID2 | Type 1 | 7 years | 9000 km | 0.7 | Sunny | Dried |
| 3 | ID3 | Type 2 | 3 years | 3000 km | 0.7 | Rainy | Wetted |
| 4 | ID4 | Type 2 | 5 years | 6000 km | 0.7 | Cloudy | Dried |
| . . . | . . . | . . . | . . . | . . . | . . . | . . . | . . . |

In Tables 2 and 3, the anomaly candidate number is an identification number assigned for each anomaly candidate information, the vehicle ID is identification information assigned to the vehicle 10 in which the anomaly candidate information is detected. In Table 2, the occurrence day is a day in which the anomaly candidate information is detected. The occurrence position is GPS information of a position where the anomaly candidate information is detected or positional information such as the address. The related portion is a portion of the vehicle 10 regarding the anomaly candidate information. The vehicle type is a vehicle type of the vehicle 10 in which the anomaly candidate information is detected. The part information is information of the part configuring the vehicle 10 in which the anomaly candidate information is detected. The normal driving characteristic type is a driving characteristic type of the driver at a time of normal classified by the driving characteristic classification unit 90.

road surface condition is a road surface condition in the day and the area in which the anomality candidate information is detected.

In the example illustrated in Tables 2 and 3, the vehicle ID, the occurrence day, the occurrence position, the relating portion, the part information, the use years, the cumulative driving distance, and the occurrence frequency are included in the monitoring object information. In addition, the weather and the road surface condition are included in the environment information and the normal driving characteristic type and the anomaly driving characteristic type are included in the operator information. The monitoring object information, the environment information, and the operator information stored in the storage unit 30 are not limited to the example illustrated in Tables 2 and 3. For example, the storage unit 30 may store the area where the vehicle 10 frequently travels, the manufacturing number and the manufacturing date of the part, or the like.

FIG. 5 is a block diagram illustrating an example of a more detailed configuration of the analysis unit 40 illustrated in FIG. 2.

The analysis unit 40 can include, for example, an anomaly candidate information extraction unit 41, an occurrence rate calculation unit 42, an environment dependence degree calculation unit 43, and a driving characteristic dependence degree calculation unit 44. For example, the anomaly candidate information extraction unit 41 extracts an anomaly estimated to depend on the vehicle type or the part from the anomaly candidate information stored in the storage unit 30.

The storage unit 30 is also a database of the anomaly candidate information in which the monitoring object information when the operation of the vehicle 10 different from the intention of the driver is detected is stored as the anomaly candidate information. However, in the anomaly candidate information stored in the storage unit 30, the anomaly candidate information regarding the external environment or the driving characteristic of the driver in addition to the anomaly candidate information regarding the anomaly of the vehicle part is included. More specifically, for example, by the external environment including the weather such as snow cover, the road surface condition such as freezing of the road surface, and the road environment such as the blind intersection, a case where the acceleration and deceleration intended by the driver cannot be obtained or a case where the anomaly occurs in the driver such as a case where the driver is tired or the like are included in the anomaly candidate information stored in the storage unit 30.

Therefore, the analysis unit 40 excludes the anomaly candidate information associated with the specific environment information or the specific operator information from the extraction. More specifically, for example, the analysis unit 40 extracts an anomaly estimated to depend on the vehicle type or the part from the anomaly candidate information stored in the storage unit 30 by the anomaly candidate information extraction unit 41. Therefore, the analysis unit 40 can exclude the anomaly candidate information regarding the specific external environment or the specific driving characteristic from the anomaly candidate information to be extracted. The extraction and exclusion of the anomaly candidate information by such an anomaly candidate information extraction unit 41 are performed based on the condition set previously.

More specifically, for example, in the weather when the amount of the snow cover is equal to or more than a certain amount and the road surface condition, since the anomaly candidate information regarding the breaking device is greatly affected by the snow cover, the anomaly candidate information is not extracted by the anomaly candidate information extraction unit 41 and can be excluded from the anomaly candidate information to be output by the analysis unit 40. In addition, for example, since the anomaly candidate information detected at a site where sudden deceleration is frequently observed such as a blind intersection is greatly affected by the road environment, the anomaly candidate information cannot be extracted by the anomaly candidate information extraction unit 41 and can be excluded from the anomaly candidate information to be output by the analysis unit 40. In addition, for example, in a case where the anomaly driving characteristic type when the anomaly candidate information is detected is different from the normal driving characteristic type, as a case where the anomaly occurs in the driver, the case is not extracted by the anomaly candidate information extraction unit 41 and can be excluded from the anomaly candidate information to be output by the analysis unit 40.

In this manner, the analysis unit 40 excludes the anomaly candidate information associated with the specific environment information or the specific operator information from the extraction, whereby excluding the anomaly candidate information depending on the specific weather or road surface condition or the specific driving characteristic type and extracting the anomaly candidate information depending on the vehicle type or the part. Accordingly, by the analysis unit 40, it is possible to more accurately calculate an anomaly candidate curve describe below.

For example, anomaly occurrence number assumption information regarding the use years and the number of anomaly occurrences assumed for each type of vehicle and parts in advance is input and stored in the occurrence rate calculation unit 42. The occurrence rate calculation unit 42 can perform creation of the anomaly candidate curve and calculation of the occurrence rate of the anomaly candidate information using the anomaly occurrence number assumption information input and stored in advance and the anomaly candidate information extracted by the anomaly candidate information extraction unit 41.

More specifically, for example, the occurrence rate calculation unit 42 accumulates the detection number of the anomaly candidate information items for each use year and for each vehicle type and part based on the anomaly candidate information extracted by the anomaly candidate information extraction unit 41, whereby creating the anomaly candidate curve. In addition, for example, the occurrence rate calculation unit 42 can calculate the occurrence rate of the anomaly candidate information by dividing the cumulative detection number of the actual anomaly candidate information to be obtained by the anomaly candidate information curve by the anomaly occurrence number stored and assumed by the occurrence rate calculation unit 42 for each type of vehicle and the use years of the parts. That is, the occurrence rate of the anomaly candidate information is a value indicating how much anomaly candidate information is actually detected, as compared with the number of occurrence of anomalies for each of the use years assumed for each type of the vehicle and the parts The environment dependence degree calculation unit 43 calculates an environment dependence degree based on the anomaly candidate information extracted by the anomaly candidate information extraction unit 41. The environment dependence degree is a value indicating how much the anomaly candidate information depending on the type of vehicle or parts depends on the specific environment information and a value which is obtained by dividing the anomaly occurrence number for each of the environment information items by the detection number of the anomaly candidate information items extracted by the anomaly candidate information extraction unit 41.

Here, for example, the environment dependence degree is calculated for each of the assumed environment information items. For example, in a case where the weather is selected as the environment information, a bias in the detection number of the anomaly candidate information items is confirmed for different weathers such as sunny weather, cloudy weather, rainy weather, and snow weather. In addition, for example, in a case where a terrain is selected as the environment information, the bias in the detection number of the anomaly candidate information items is confirmed for the terrain such as near the intersection, the straight road, or the mountain path or road environment. In addition to this, the environment dependence degree can be confirmed by the road surface condition or the environment information of frequently traveled routes.

The driving characteristic dependence degree calculation unit 44 calculates the driving characteristic dependence degree based on the anomality candidate information extracted by the anomality candidate information extraction unit 41. The driving characteristic dependence degree is a value obtained by dividing the detection number of the anomality candidate information items for each of the driving characteristic type by the total of the detection number of the anomality candidate information items similar to the environment dependence degree. That is, the driving characteristic dependence degree is a value indicating what type of the anomality candidate information is likely to be detected on which type of driving characteristic for each vehicle type and the parts.

FIG. 6 is a flow chart illustrating an example of the operation of the anomality candidate information analysis apparatus 100 of the present embodiment.

As described above, the anomality candidate information analysis apparatus 100 of the present embodiment is the monitoring center 20 outside the vehicle 10 for creating the anomality candidate information of the vehicle 10 that is the monitoring object or a monitoring system including the monitoring center 20, and the communication unit 60 and the detection unit 50 mounted on the vehicle 10. The monitoring center 20 includes the storage unit 30 that stores the monitoring object information, the environment information, the operator information, and the anomality candidate information in association with each other. In addition, the monitoring center 20 includes the analysis unit 40 that extracts the anomality candidate information associated with the monitoring object information, the environment information, and the operator information and analyzes the dependence degree of the anomality candidate information to the environment information and the operator information.

In Step S1 illustrated in FIG. 6, for example, the analysis unit 40 extracts the anomality candidate information depending on the vehicle type and the parts from the anomality candidate information stored in the storage unit 30 by the anomality candidate information extraction unit 41 illustrated in FIG. 5.

Next, in Step S2, for example, the analyst belonging to the monitoring center 20 selects the vehicle types or the parts displaying the anomality candidate information by operating the analysis unit 40. The analysis unit 40 extracts information such as the monitoring object information, the environment information, the operator information, and the anomality candidate information which are associated with the selected vehicle types or the parts.

FIG. 7 is a graph illustrating an example of the assumed anomaly curve and the anomality candidate curve.

In the graph illustrated in FIG. 7, a horizontal axis represents the use years for each of the vehicle types or the parts and a vertical axis represents the detection number of the anomality candidate information or the assumed anomaly number. In FIG. 7, a solid line is the anomality candidate curve of the selected vehicle types or the parts, that is, a curve indicating a relationship between the use years and the detection number of the anomality candidate information. In addition, in FIG. 7, a broken line is the assumed anomaly curve of the selected vehicle types or the parts, that is, a curve indicating a relationship between the use years and the anomaly occurrence number which is assumed in advance.

For example, in Step S2, as illustrated in FIG. 7, the analysis unit 40 calculates the anomality candidate curve and the assumed anomaly curve for each of the selected vehicle types or the parts and displays the calculated curves on the display device such as a monitor, whereby presenting the displayed curves to the analyst of the monitoring center 20. In a case where the anomality candidate curve increases at a shorter use years than the assumed anomaly curve, the analyst can distinguish the anomality candidate information as an anomality candidate information having a possibility of the unexpected anomality.

Next, in Step S3, the analysis unit 40 calculates the occurrence rate of the anomality candidate information based on the detection number of the anomality candidate information items and the assumed anomality occurrence number by the occurrence rate calculation unit 42 illustrated in FIG. 5 for each of the selected vehicle types and the parts for example. An example of the occurrence rate of the anomality candidate information for each of the vehicle types and the parts calculated by the occurrence rate calculation unit 42 is illustrated in Table 4 below.

TABLE 4

| Vehicle type | Part | Anomality candidate information occurrence rate |
|---|---|---|
| Vehicle type 1 | Part 1 | 0.9 |
| Vehicle type 1 | Part 2 | 2.1 |
| Vehicle type 2 | Part 1 | 0.7 |
| ... | ... | ... |

In Step S3, for example, the analysis unit 40 calculates the occurrence rate of the anomality candidate information for each of the selected vehicle types or the parts and displays the calculated occurrence rate on the display device such as the monitor as illustrated in Table 4, whereby presenting the displayed occurrence rate to the analyst of the monitoring center 20. In a case where the occurrence rate of the anomality candidate information is higher than a predetermined threshold value, the analyst can distinguish the anomality candidate information as an anomality candidate information having a possibility of the unexpected anomality.

Next, in Step S4, for example, the analysis unit 40 calculates the environment dependence degree for each of the assumed environment information items by the environment dependence degree calculation unit 43 illustrated in FIG. 5 as described above.

FIG. 8 is a graph illustrating an example of the environment dependence degree of the detection number of the anomality candidate information items for each of the vehicle types and the parts. In FIG. 8, the vertical axis represents the detection number of the anomality candidate information items and a, b, c, and d of the horizontal axis represent the environment information such as the sunny, the cloudy, the rainy, and the snow cover, for example. As describe above, the environment information can includes, for example, the temperature, the atmospheric pressure, the humidity, the altitude, the time zone, the road surface condition, the traffic condition, the road condition such as the inclination and the curve, the surrounding environment such as the urban area and the mountain, the road information such as the toll road and the national road, in addition to the weather.

For example, the environment dependence degree calculation unit 43 calculates the environment dependence degree based on the bias of the detection number of the anomality candidate information between the environment information items illustrated in FIG. 8. The environment dependence degree calculation unit 43 presents the graph illustrated in FIG. 8 to the analyst of the monitoring center 20 by displaying the graph on the display device such as the monitor. Therefore, the analyst may determine the environment dependence degree based on the graph. In the example illustrated in FIG. 8, from the fact that there is no great bias in the detection number of the anomaly candidate information between the environment information items, it is considered that the environment dependence degree of the anomaly candidate information is low.

Next, in Step S5, for example, the analysis unit 40 calculates the driving characteristic dependence degree based on the anomaly candidate information extracted by the anomaly candidate information extraction unit 41 by the driving characteristic dependence degree calculation unit 44 illustrated in FIG. 5, as described above.

FIG. 9 is a graph illustrating an example of the driving characteristic dependence degree of the detection number of the anomaly candidate information for each of the vehicle types and the parts. In FIG. 9, the vertical axis represents the detection number of the anomaly candidate information items and the horizontal axis represents driving characteristic types 1 to 4. As described above, the driving characteristic type is, for example, a plurality of types classified according to the tendency of the operation of the operator of the vehicle 10, that is, the tendency of the driving of the driver.

For example, the driving characteristic dependence degree calculation unit 44 calculates the driving characteristic dependence degree based on the bias of the detection number of the anomaly candidate information items between the driving characteristic types illustrated in FIG. 9. The driving characteristic dependence degree calculation unit 44 presents the graph illustrated in FIG. 9 to the analyst of the monitoring center 20 by displaying the graph on the display device such as the monitor. Therefore, the analyst may determine the driving characteristic dependence degree based on the graph.

In the example illustrated in FIG. 9, among the detection number of the anomaly candidate information items between the driving characteristic types, from the fact that the detection number of the anomaly candidate information is particularly large in the driving characteristic type 2, it is found that the driving characteristic dependence degree is high. Therefore, the analyst can distinguish that a driving characteristic type 2 is effective for reproducing the anomality candidate information and can use the distinguish result for investigating the cause of the anomaly candidate information.

Next, in Step S6, the anomaly candidate curve and the assumed anomaly curve calculated in Step S2, the occurrence rate of the anomaly candidate information calculated in Step S3, the environment dependence degree calculated in Step S4, and the driving characteristic dependence degree calculated in Step S5 are generated as the anomaly candidate information in association with the selected vehicle types or the parts.

Next, in Step S7, it is determined whether the generation of the anomaly candidate information from Step S2 to Step S6 for all of the vehicle types and the parts to be required for creating the anomaly candidate information is completed. As a result of the determination, if the generation is not completed (NO), the process returns to Step S2, and if the generation is completed (YES), a generation flow of the anomaly candidate information by the analysis unit 40 is ended.

FIG. 10 is an image diagram illustrating an example of an output screen of the anomaly candidate information generated by the analysis unit 40.

The analysis unit 40 includes, for example, a setting unit capable of setting the condition for extracting the monitoring object information, and a display unit for displaying the anomaly candidate information extracted based on the setting condition by the setting unit. The analysis unit 40 can display the anomaly candidate information generated in Step S6 on, for example, a display unit 45 configured by the display device such as the monitor, as illustrated in FIG. 10. In the example illustrated in FIG. 10, a display screen of the display unit 45 includes a selection field 46 for selecting the vehicle type or the part. The selection field 46 can be used for inputting the extraction condition to the setting unit of the analysis unit 40 through an input device such as a keyboard or a mouse, for example.

The display unit 45 displays, for example, a relationship between the detection numbers and the assumed number of anomalies of the anomaly candidate information and a use period, a relationship between the detection number of the anomaly candidate information items and the environment information, and a relationship between the detection number of the anomaly candidate information items and the operator information items. More specifically, the display unit 45 displays, for example, a table 45a indicating the occurrence rate of the anomaly candidate information, a graph 45b of the anomaly candidate curve and the assumed anomaly curve, a graph 45c indicating the environment dependence degree of the anomaly candidate information, and a graph 45d indicating the driving characteristic dependence degree of the anomaly candidate information with respect to the specific vehicle type or the part selected in the selection field 46.

For example, the selection field 46 can be configured such that a plurality of vehicle types and a plurality of parts can be selected. In addition, for example, the selection field 46 may be configured such that a production number, a production time, a use year, and the like for each part can be selected. In addition, in the display unit 45, the anomaly candidate information items can be rearranged according to the vehicle type, the part, and the occurrence rate of the anomaly candidate information, and may be displayed in a color-coded manner according to the occurrence rate of the anomaly candidate information.

By such a configuration, the analyst of the monitoring center 20 can designate the vehicle type or the part having a high occurrence rate of the anomaly candidate information or a combination thereof based on the table 45a indicating the occurrence rate of the anomaly candidate information displayed on the display unit 45. Furthermore, the analyst can specify the vehicle type and the part having a high possibility that the unexpected anomaly occurs and the combination thereof by confirming the anomaly candidate information of the designated vehicle type and part and the combination thereof.

In addition, the analyst of the monitoring center 20 can distinguish the occurrence of the unexpected anomaly by confirming the relationship between the detection number of the anomaly candidate information and the assumed anomaly number and the use year displayed on the display unit 45, that is, the graph 45b of the anomaly candidate curve and the assumed anomaly curve. The graph 45b of the anomaly candidate curve and the assumed anomaly curve can simultaneously display and compare a plurality of vehicle types and a plurality of parts, for example.

In addition, the analyst of the monitoring center 20 can easily specify the environment in which the anomaly candidate information is easily detected by confirming the relationship between the detection number of the anomaly candidate information displayed on the display unit 45 and the environment information, that is, a graph 45c indicating the environment dependence degree of the anomaly candidate information. In addition, for example, the analyst can arbitrarily select the environment information such as the weather, the road surface condition, and the terrain to be displayed on the graph 45c in the selection field 46. In addition, the graph 45c indicating the environment dependence degree of the anomaly candidate information can simultaneously display and compare the detection number of the anomaly candidate information items of the plurality of vehicle types and a plurality of parts, for example.

In addition, the analyst of the monitoring center 20 can easily specify the driving characteristic type in which the anomaly candidate information is easily detected by confirming the relationship between the detection number of the anomaly candidate information items displayed on the display unit 45 and the operator information, that is, the graph 45d indicating the driving characteristic dependence degree of the anomaly candidate information. In addition, the graph 45d indicating the driving characteristic dependence degree of the anomaly candidate information can simultaneously display and compare the detection number of the anomaly candidate information items of the plurality of vehicle types and a plurality of parts, for example.

In addition, the analyst of the monitoring center 20 can set the condition of the anomaly candidate information to be extracted by the selection field 46. Accordingly, the analyst narrows down the condition in which the anomaly candidate information having a possibility of the unexpected anomaly is detected while changing the condition for extracting the anomaly candidate information.

As described above, the anomaly candidate information analysis apparatus 100 of the present embodiment is the monitoring center 20 outside the vehicle 10 for creating the anomaly candidate information of the vehicle 10 that is the monitoring object or a monitoring system including the monitoring center 20, and the communication unit 60 and the detection unit 50 mounted on the vehicle 10. The monitoring center 20 includes the storage unit 30 that stores the monitoring object information, the environment information, the operator information, and the anomaly candidate information in association with each other. In addition, the monitoring center 20 includes the analysis unit 40 that extracts the anomaly candidate information associated with the monitoring object information, the environment information, and the operator information and analyzes the dependence degree of the anomaly candidate information to the environment information and the operator information.

By such a configuration, the anomaly candidate information is extracted based on the monitoring object information such as the specific vehicle type or the part by the analysis unit 40 and the dependence degree of the anomaly candidate information to the environment information, and the operator information can be analyzed. Therefore, according to the anomaly candidate information analysis apparatus 100 of the present embodiment, it is possible to early confirm that the unexpected anomaly occurs in the monitoring object such as the vehicle 10 and specify the cause. Accordingly, even in a complex vehicle system that collects the data items of the vehicle 10, analyzes the collected data items, and provides services such as driving support and destination guidance, maintenance and management of the vehicle 10 can be more efficiently performed.

In addition, the behavior of the vehicle 10 varies depending on the many causes such as the external environment of the vehicle 10 or the driving characteristic of the driver, or the degree of the progress of anomaly. However, in the conventional anomaly detection, it is difficult to consider the cause such as the external environment or the driving characteristic. For example, the conventional anomaly detection may be a detection performed with a threshold value determined by a designer or a detection performed with a distance from the normal operating data learned. In such a conventional method, since an operation amount intended by the driver for each external environment is not known, it is difficult to early detect the anomaly. Therefore, only a case where it is clearly different from the intention of the driver is detected as the anomaly. With respect to this, according to the anomaly candidate information analysis apparatus 100 of the present embodiment, since the operation amount intended by the driver for each external environment can be known, it is possible to detect the anomaly earlier than the related art.

As above, the embodiments of the present invention are described with reference to the drawings. However, specific constructions are not limited to the embodiments, and a range of design changes or the like are also included provided they do not depart from the scope of the invention.

REFERENCE SIGNS LIST

10: VEHICLE (MONITORING OBJECT)
30: STORAGE UNIT
40: ANALYSIS UNIT
45: DISPLAY UNIT
45b: GRAPH (RELATIONSHIP BETWEEN DETECTION NUMBER OF ANOMALY CANDIDATE INFORMATION AND ASSUMED ANOMALY NUMBER AND USE YEAR)
45c: GRAPH (RELATIONSHIP BETWEEN DETECTION NUMBER OF ANOMALY CANDIDATE INFORMATION AND ENVIRONMENT INFORMATION)
45d: GRAPH (RELATIONSHIP BETWEEN DETECTION NUMBER OF ANOMALY CANDIDATE INFORMATION AND OPERATOR INFORMATION)
46: SELECTION FIELD (SETTING UNIT)
50: DETECTION UNIT
52: DRIVING CHARACTERISTIC LEARNING UNIT (BEHAVIOR PREDICTION DEVICE)
52d: RECURRENT NEURAL NETWORK
53: ANOMALY OPERATION DETECTION UNIT
60: COMMUNICATION UNIT
90: DRIVING CHARACTERISTIC CLASSIFICATION UNIT
100: ANOMALITY CANDIDATE INFORMATION ANALYSIS APPARATUS

The invention claimed is:

1. An anomaly candidate information analysis apparatus for analyzing anomaly candidate information of a monitoring object, comprising:
a storage unit that stores monitoring object information regarding the monitoring object, environment information regarding an environment around the monitoring object, operator information regarding an operator of the monitoring object, and anomaly candidate information detected in the monitoring object in association with each other;

an analysis unit that extracts the anomaly candidate information associated with the monitoring object information, the environment information, and the operator information, and analyzes a dependence degree of the anomaly candidate information to the environment information and the operator information; and a detection unit that is provided on the monitoring object, and detects the monitoring object information, the operator information, and the anomaly candidate information;

wherein the detection unit includes a driving characteristic learning unit that learns an operation performed by the operator of the monitoring object as a driving characteristic from a detection value of the monitoring object information and calculates a next detection value at a predetermined time after the detection value was detected as a prediction value, and an anomaly operation detection unit that detects the detection value of the monitoring object information as the anomaly candidate information using the prediction value calculated by the driving characteristic learning unit as a threshold value;

wherein the analysis unit excludes the anomaly candidate information which is associated with specific environment information or specific operator information from extraction;

wherein the analysis unit includes a setting unit capable of setting a condition for extracting the monitoring object information, and a display unit that displays the extracted anomalitycandidate information based on the condition; and wherein the display unit displays a relationship between the detection numbers and the assumed number of anomalies of the anomaly candidate information and a use period, a relationship between a detection number of the anomaly candidate information items and environment information items, and a relationship between the detection number of the anomaly candidate information items and operator information items.

2. The anomaly candidate information analysis apparatus according to Claim 1, further comprising:

a driving characteristic classification unit that classifies a driving characteristic included in the operator information into one of a plurality of driving characteristic types.

3. An anomaly candidate information analysis apparatus for analyzing anomaly candidate information of a monitoring object, comprising:

a storage unit that is provided in a monitoring center and stores monitoring object information regarding the monitoring object, environment information regarding an environment around the monitoring object, operator information regarding an operator of the monitoring object, and anomaly candidate information detected in the monitoring object in association with each other;

an analysis unit that is provided in the monitoring center and extracts the environment information, the operator information, and the anomaly candidate information associated with the monitoring object information, and analyzes a dependence degree of the anomaly candidate information to the environment information and the operator information;

a detection unit that is provided on the monitoring object, and detects the monitoring object information, the operator information, and the anomaly candidate information; and a communication unit that is provided on the monitoring object, and transmits the monitoring object information, the operator information, and the anomaly candidate information detected by the detection unit to the storage unit;

wherein the detection unit includes a driving characteristic learning unit that learns an operation performed by an operator of the monitoring object as a driving characteristic from a detection value of the monitoring object information and calculates a next detection value at a predetermined time after the detection value was detected as a prediction value, and an anomaly operation detection unit that detects the detection value of the monitoring object information as the anomaly candidate information using the prediction value calculated by the driving characteristic learning unit as a threshold value.

4. The anomaly candidate information analysis apparatus according to claim 3, wherein the driving characteristic learning unit includes a convolution layer that processes the monitoring object information, and a recurrent neural network that inputs a process result of the convolution layer and the detection value of the monitoring object information.

5. The anomaly candidate information analysis apparatus according to claim 4, wherein the driving characteristic learning unit includes a plurality of recurrent neural networks.

6. The anomaly candidate information analysis apparatus according to claim 5, wherein the anomaly operation detection unit sets the prediction value among a plurality of prediction values of the plurality of recurrent neural networks as the threshold value.

* * * * *